(12) United States Patent
Chang et al.

(10) Patent No.: US 7,968,858 B2
(45) Date of Patent: Jun. 28, 2011

(54) SYSTEM AND METHOD FOR SCANNING AND MEASURING POINTS OF AN OBJECT

(75) Inventors: Chih-Kuang Chang, Taipei Hsien (TW); Zhong-Kui Yuan, Shenzhen (CN); Yan-Li Li, Shenzhen (CN); Li Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 792 days.

(21) Appl. No.: 11/960,743

(22) Filed: Dec. 20, 2007

(65) Prior Publication Data

US 2009/0002719 A1   Jan. 1, 2009

(30) Foreign Application Priority Data

Jun. 28, 2007   (CN) .......................... 2007 1 0200907

(51) Int. Cl.
*G06K 9/68* (2006.01)
(52) U.S. Cl. .............................. 250/559.05; 250/559.06
(58) Field of Classification Search ............... 250/208.1, 250/201.2, 201.4, 559.05, 559.06
See application file for complete search history.

(56) References Cited

U.S. PATENT DOCUMENTS

| | | | |
|---|---|---|---|
| 4,532,420 A | 7/1985 | Nakajima | |
| 5,134,665 A | 7/1992 | Jyoko | |
| 7,595,471 B1 * | 9/2009 | Mihaylov | 250/201.2 |
| 2005/0054502 A1 * | 3/2005 | Benyovits | 493/69 |
| 2005/0092909 A1 * | 5/2005 | Spahn | 250/252.1 |

FOREIGN PATENT DOCUMENTS

| | | |
|---|---|---|
| CN | 2676151 Y | 2/2005 |
| CN | 1609548 A | 4/2005 |
| CN | 2833515 Y | 11/2006 |
| JP | 9-196625 A | 7/1997 |
| JP | 11-351858 A | 12/1999 |
| JP | 2003106820 A | 4/2003 |

* cited by examiner

*Primary Examiner* — Tony Ko
(74) *Attorney, Agent, or Firm* — Frank R. Niranjan

(57) ABSTRACT

A method for scanning and measuring points of an object is provided. The method includes: (a) selecting a measuring start point and a measuring end point from an image of the object; (b) controlling a laser to move and scan the object from the measuring start point to the measuring end point with a predetermined distance according to X-axis coordinate values and Y-axis coordinate values of the measuring start point and the measuring end point to obtain scanned measuring points; (c) obtaining a vertical distance between each of the scanned measuring points and the laser; and (d) computing measuring results, namely computing a Z-axis coordinate value of each of the scanned measuring points according to the corresponding vertical distance. A related system is also provided.

8 Claims, 3 Drawing Sheets

SYSTEM AND METHOD FOR SCANNING AND MEASURING POINTS OF AN OBJECT

BACKGROUND OF THE INVENTION

1. Field of the Invention

The present invention generally relates to image measuring systems and methods, particularly to a system and method for scanning and measuring points of an object.

2. Description of Related Art

Nowadays, the method of image measuring is widely used in precision measurement field. Measuring objects by using the method of image measuring is very accurate and fast.

Conventionally, when measuring the objects using the method of image measuring, a lens module is used for focusing the objects, and a charged coupled device (CCD) is used for capturing the images of the objects focused by the lens module. The images captured by the CCDs are then transmitted to an image acquiring card of a computer, and a measuring program installed in the computer measures the images automatically.

However, in the existing image measuring method, if users want to measure points of the objects, using the lens module to focus the points on the objects, time is wasted and accuracy is very low. Furthermore, technique of smoothing measuring results of the points is imperfect.

SUMMARY OF THE INVENTION

A preferred embodiment provides a system for scanning and measuring points of an object. The system includes a computer and a measuring machine. The computer includes an image acquiring card. A charged coupled device is installed in the measuring machine, and the charged coupled device works with a lens module for acquiring an image of the object. The measuring machine includes a laser. The computer further includes a selected module and a measuring module. The selecting module is configured for a user to select a measuring start point and a measuring end point from the image of the object. The laser is configured for moving and scanning the object from the measuring start point to the measuring end point with a predetermined distance according to X-axis coordinate values and Y-axis coordinate values of the measuring start point and the measuring end point to obtain scanned measuring points, and for obtaining a vertical distance between each of the scanned measuring points and the laser. The measuring module is configured for computing measuring results, namely computing a Z-axis coordinate value of each of the scanned measuring points according to the corresponding vertical distance.

Another preferred embodiment provides a method for scanning and measuring points of an object. The method includes: (a) selecting a measuring start point and a measuring end point from an image of the object; (b) controlling a laser to move and scan the object from the measuring start point to the measuring end point with a predetermined distance according to X-axis coordinate values and Y-axis coordinate values of the measuring start point and the measuring end point to obtain scanned measuring points; (c) obtaining a vertical distance between each of the scanned measuring points and the laser; and (d) computing measuring results, namely computing a Z-axis coordinate value of each of the scanned measuring points according to the corresponding vertical distance.

Other advantages and novel features of the present invention will become more apparent from the following detailed description of preferred embodiment when taken in conjunction with the accompanying drawings.

DETAILED DESCRIPTION OF THE INVENTION

Figure 1:
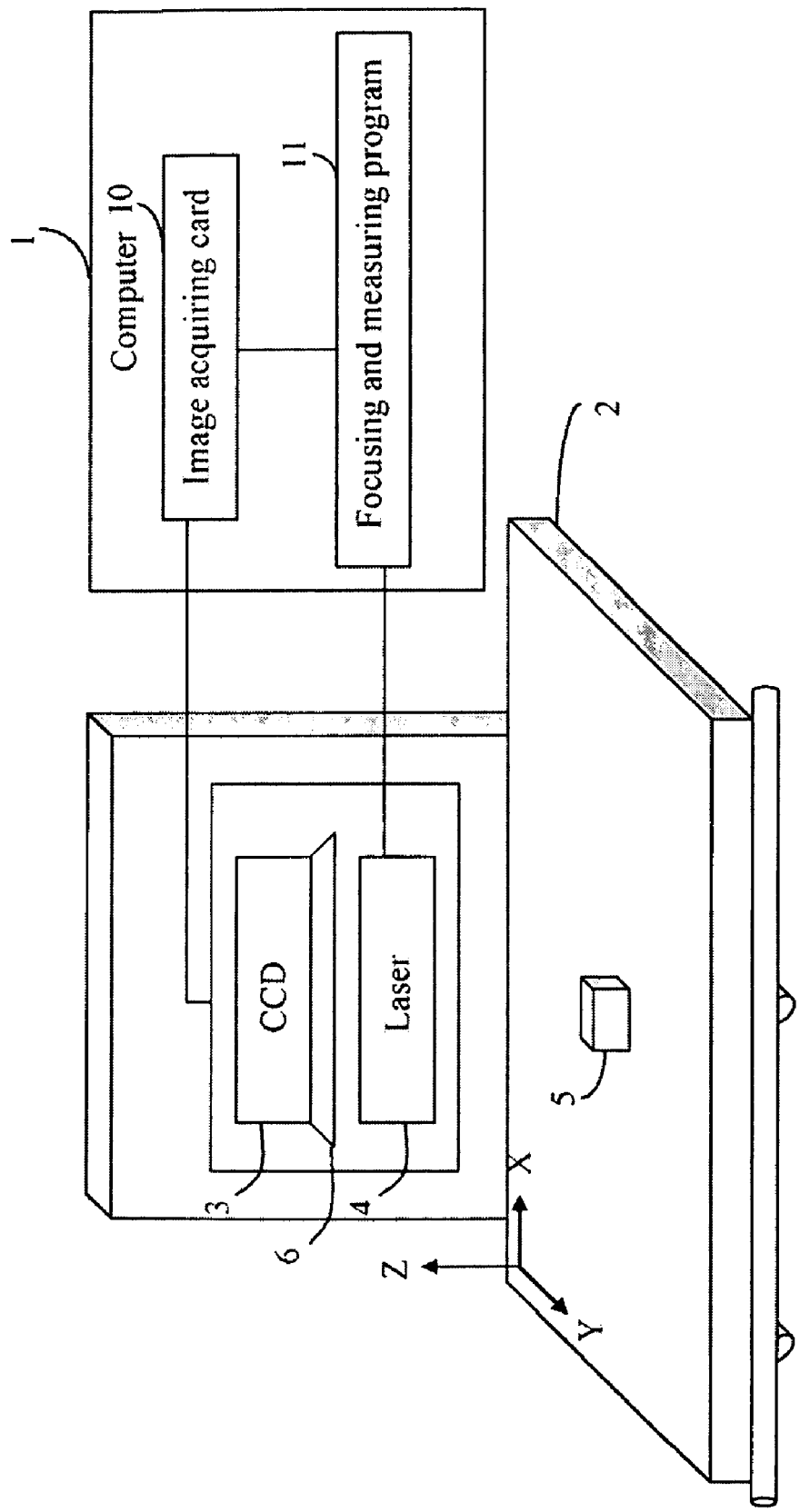
FIG. 1 is a schematic diagram of hardware configuration of a system for scanning and measuring points of an object in accordance with a preferred embodiment.

FIG. 1 is a schematic diagram of hardware configuration of a system for scanning and measuring points of an object (hereinafter "the system"), in accordance with a preferred embodiment. The system typically includes a computer 1 and a measuring machine 2 on which an under-measured object 5 is placed. A CCD 3 and a lens module 6 are installed on the Z-axle of the measuring machine 2. The CCD 3 is used for capturing an image of the under-measured object 5 when the lens module 6 focuses the under-measured object 5.

Furthermore, a laser 4 is also installed on the Z-axle of the measuring machine 2. The laser 4 is used for scanning points on the under-measured object 5, wherein the points can be selected from the image of the under-measured object 5.

The computer 1 may include an image acquiring card 10 and a focusing and measuring program 11. The image acquiring card 10 is connected with the CCD 3, for example, through a cable, and is configured for acquiring the image of the under-measured object 5 from the CCD 3. The image acquired by the image acquiring card 10 can be shown on a display of the computer 1. The focusing and measuring program 11 includes a plurality of software function modules, for measuring points of the under-measured object 5.

Figure 2:
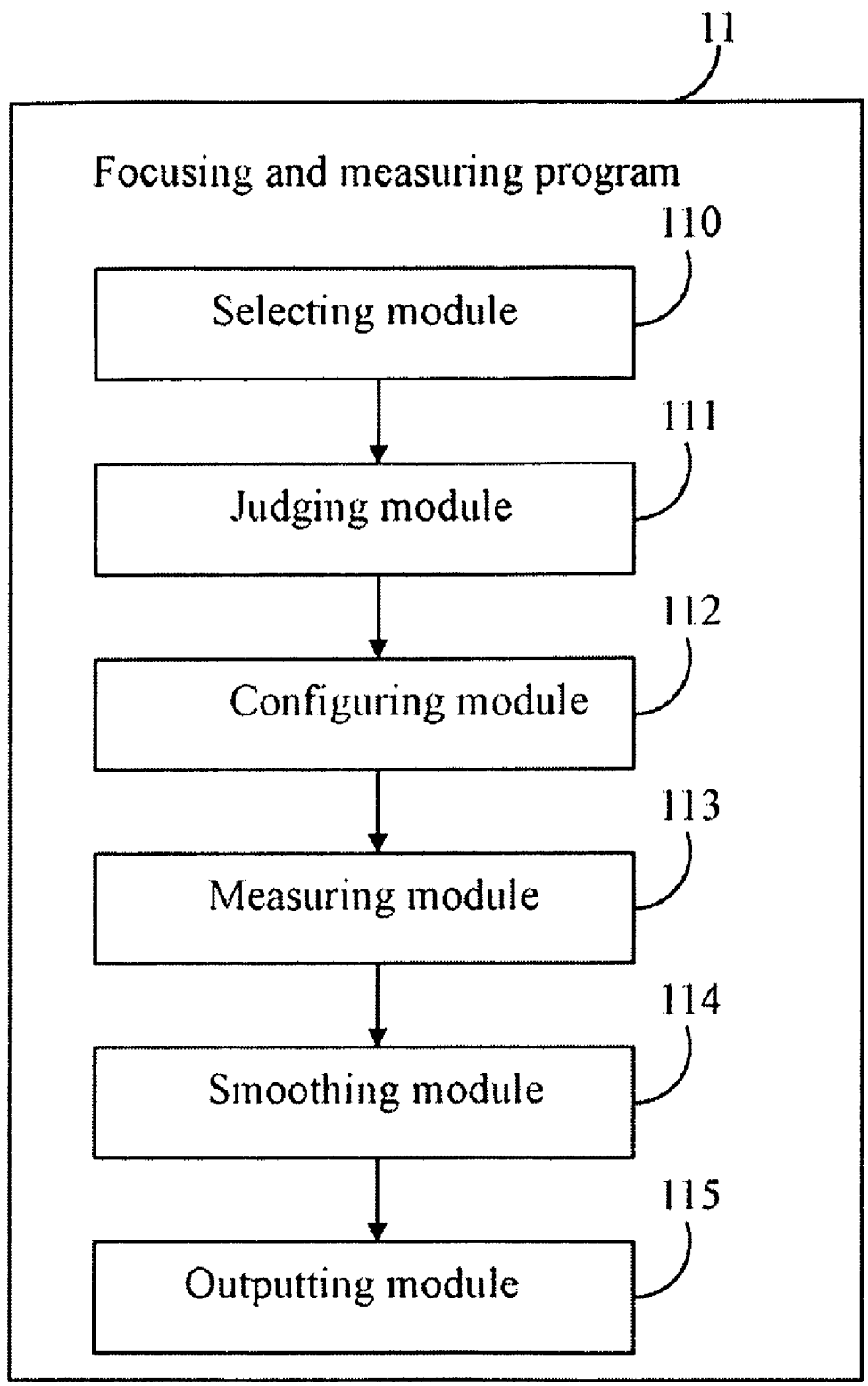
FIG. 2 is a block diagram of function modules of a focusing and measuring program in FIG. 1.

FIG. 2 is a block diagram of function modules of the focusing and measuring program 11 in FIG. 1. The focusing and measuring program 11 mainly includes: a selecting module 110, a judging module 111, a configuring module 112, a measuring module 113, a smoothing module 114, and an outputting module 115.

The selecting module 110 is configured for selecting a measuring start point (hereinafter "start point") and a measuring end point (hereinafter "end point") from the image of the under-measured object 5 by a user, for controlling the laser 4 to move and scan the under-measured object 5 from the start point to the end point with a predetermined distance according to X-axis coordinate values and Y-axis coordinate values of the start point and the end point to obtain scanned measuring points, and further for obtaining a vertical distance between the laser 4 and each of the scanned measuring points.

The judging module 111 is configured for determining whether the start point and the end point are valid by judging whether the start point and the end point are within a preconfigured image area. If the start point and the end point are both within the predetermined image area, the selected start point and the end point are valid. Otherwise, if any one of the start point and the end point is outside the predetermined image area, the start point and the end point are deleted and selected once again.

The configuring module 112 is configured for receiving measuring items configured by the user, if the measuring items are needed. The measuring items may include, such as, a maximum Z-axis coordinate value, a minimum Z-axis coordinate value, an average Z-axis coordinate value for all measuring points, and smoothness for the Z-axis coordinate values of the scanned measuring points, etc.

The measuring module 113 is configured for computing measuring results of the scanned measuring points, namely computing a Z-axis coordinate value of each of the scanned measuring points according to the corresponding vertical distance. If needed, the measuring module 113 is further configured for obtaining the maximum Z-axis coordinate value, the minimum Z-axis coordinate value, and for computing the average Z-axis coordinate value of the scanned measuring points.

The smoothing module 114 is configured for smoothing the Z-axis coordinate values of the scanned measuring points. The smoothing module 114 may smooth the measuring results by using a mean value method or an intermediate value method.

The mean value method can be depicted as following: computing a mean value of the Z-axis coordinate values of a point and one or two adjacent points which are adjacent to the point in a points queue; replacing the Z-axis coordinate value of the point with the mean value; and then, repeating the above steps until the Z-axis coordinate values of all the points in the points queue have been replaced.

The intermediate value method can be depicted as following: comparing the Z-axis coordinate value of a point with the Z-axis coordinate values of two adjacent points which are adjacent to the point if the point stands in the middle of a points queue, or comparing the Z-axis coordinate value of a point with the Z-axis coordinate value of one adjacent point and further with a "0" if the point stands in the ends of the points queue; obtaining a mid Z-axis coordinate value; replacing the Z-axis coordinate value of the point with the mid Z-axis coordinate value; and then, repeating the above steps until the Z-axis coordinate values of all the points in the points queue have been replaced.

The outputting module 115 is configured for outputting the measuring results in the form of text or picture.

Figure 3:
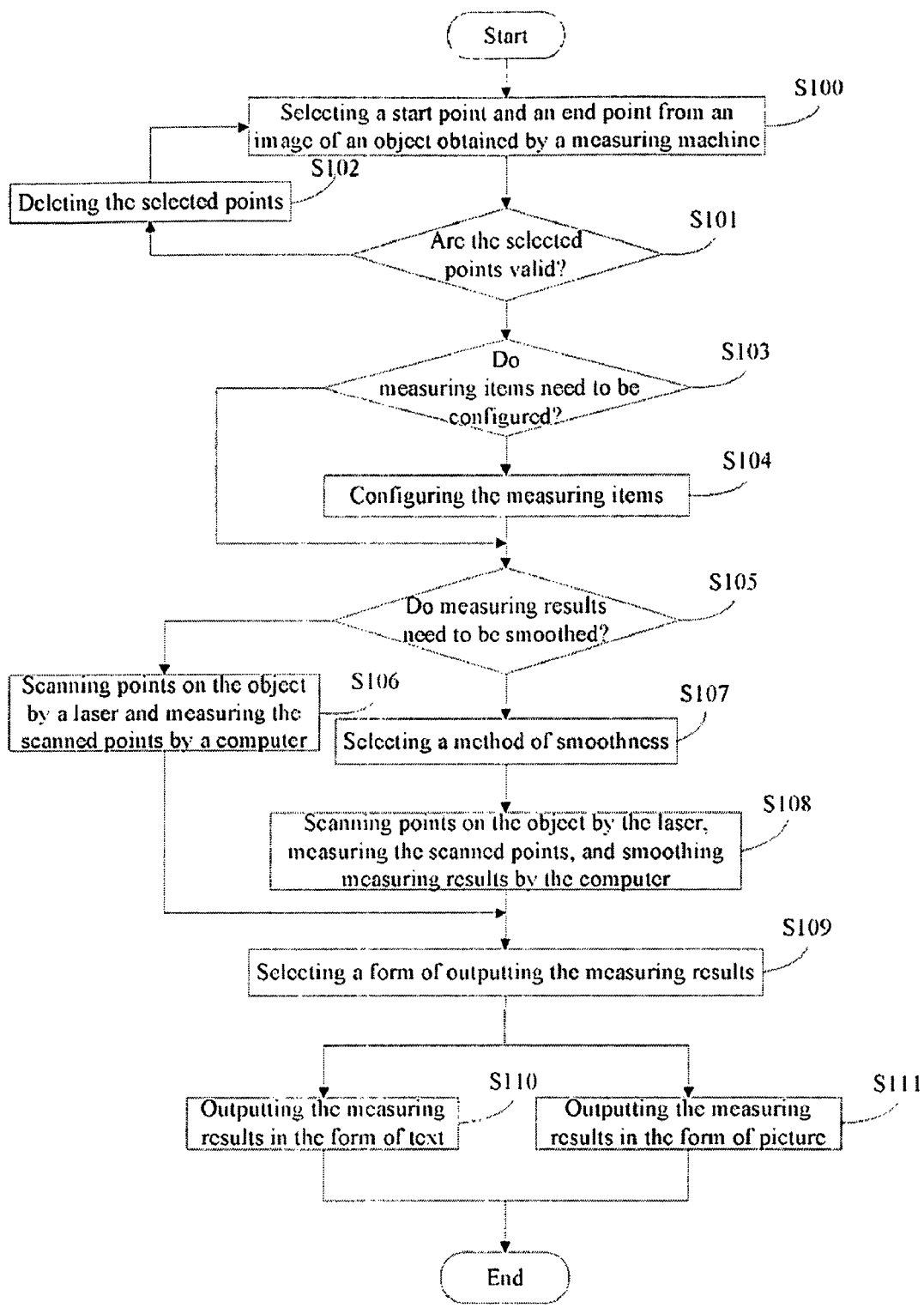
FIG. 3 is a flowchart illustrating a method for scanning and measuring points of an object in accordance with a preferred embodiment.

FIG. 3 is a flowchart illustrating a method for scanning and measuring points of an object in accordance with a preferred embodiment.

In step S100, a user selects a measuring start point (hereinafter "start point") and a measuring end point (hereinafter "end point") from the image of the under-measured object 5 through the selecting module 110.

In step S101, the judging module 111 determines whether the start point and the end point are valid by judging whether the start point and the end point are within a preconfigured image area. If any one of the start point and the end point is outside the predetermined image area, the selected start point and the end point are invalid, in step S102, prompt information pops up, prompting the user to delete the invalid start point and the end point.

If the start point and the end point are both within the predetermined image area, in step S103, the user determines whether measuring items need to be configured according to actual requirements. The measuring items may include, such as, a maximum Z-axis coordinate value, a minimum Z-axis coordinate value, an average Z-axis coordinate value for all measuring points, and smoothness for the measuring results of the measuring points, etc.

If the measuring items need not to be configured, the procedure goes directly to step S105 depicted below. Otherwise, if the measuring items need to be configured, in step S104, the configuring module 112 receives the measuring items configured by the user.

In step S105, the judging module 111 determines whether measuring results need to be smoothed according to the user's configuration. If the measuring results need to be smoothed, in step S107, the user selects a method of smoothness. The method of smoothness includes a mean value method or an intermediate value method.

In step S108, the selecting module 110 controls the laser 4 to move and scan the under-measured object 5 from the selected start point to the end point with a predetermined distance according to X-axis coordinate values and Y-axis coordinate values of the start point and the end point to obtain scanned measuring points, and obtain a vertical distances between the laser 4 and each of the scanned measuring points. The measuring module 113 computes measuring results of the scanned measuring points, namely computing a Z-axis coordinate value of each of the scanned measuring points according to the corresponding vertical distance. If needed, the measuring module 113 further obtains the maximum Z-axis coordinate value, the minimum Z-axis coordinate value, and computes the average Z-axis coordinate value of the scanned measuring points. The smoothing module 114 smoothes the Z-axis coordinate values of the scanned measuring points by using the method of smoothness selected by the user.

In an alternative embodiment, if the measuring results need not to be smoothed, in step S106, the selecting module 110 controls the laser 4 to move and scan the under-measured object 5 from the start point to the end point with the predetermined distance according to X-axis coordinate values and Y-axis coordinate values of the start point and the end point to obtain the scanned measuring points, and obtain a vertical distances between the laser 4 and each of the scanned measuring points. The measuring module 113 computes the Z-axis coordinate value of each of the scanned measuring points according to the corresponding vertical distance.

In step S109, the user selects a form of outputting the measuring results. The form of outputting the measuring results may be in the form of text or in the form picture.

If the user selects that the measuring results are outputted in the form of text, in step S110, the outputting module 115 outputs the measuring results in the form of text. In an alternative embodiment, if the user selects that the measuring results are outputted in the form of picture, in step S111, the outputting module 115 outputs the measuring results in the form of picture.

The measuring results obtained above represents a convex-concave degree of a measuring path, wherein the measuring path is a curve which begins with the start point and ends with the end point on the image. If needed, the user can select the entire image, or a part of the image, as the measuring path. Thus, the selection of the measuring path is not limited within the above depicted embodiment.

It is to be understood, however, that even though numerous characteristics and advantages of the present invention have been set forth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A system for scanning and measuring points of an object, the system comprising a computer and a measuring machine, the computer comprising an image acquiring card, the measuring machine being installed with a charged coupled device, the charged coupled device working with a lens module for capturing an image of the object, the computer acquiring the image of the object from the charged coupled device by the image acquiring card, the measuring machine comprising a laser, and the computer further comprising a selected module and a measuring module, wherein:

the selecting module is configured for a user to select a measuring start point and a measuring end point from the image of the object;

the laser is configured for scanning the object from the measuring start point to the measuring end point with a predetermined distance, according to X-axis coordinate values and Y-axis coordinate values of the measuring start point and the measuring end point to obtain scanned measuring points, and for obtaining a vertical distance between each of the scanned measuring points and the laser; and the measuring module is configured for computing measuring results, namely computing a Z-axis coordinate value of each of the scanned measuring points according to the corresponding vertical distance.

2. The system as described in claim 1, wherein the computer further comprises a configuring module and a smoothing module;

wherein:

the configuring module is configured for configuring measuring items, the measuring items comprising: a maximum Z-axis coordinate value, a minimum Z-axis coordinate value, an average Z-axis coordinate value of the scanned measuring points, and smoothness for the Z-axis coordinate value of the scanned measuring points;

the measuring module is further configured for obtaining the maximum Z-axis coordinate value and the minimum Z-axis coordinate value, and computing the average Z-axis coordinate value of the scanned measuring points; and the smoothing module is configured for smoothing the Z-axis coordinate values of the scanned measuring points.

3. The system as described in claim 2, wherein smoothing the Z-axis coordinate values is performed by a mean value method or an intermediate value method.

4. The system as described in claim 1, wherein the computer further comprises:

an outputting module configured for outputting the measuring results in the form of text or picture.

5. A method for scanning and measuring points of an object, the method comprising steps of:

(a) capturing an image of the object by a measuring machine, and transmitting the image of the object to a computer;

(a) selecting a measuring start point and a measuring end point from the image of the object by a user using the computer;

(b) controlling a laser of the measuring machine to scan the object from the measuring start point to the measuring end point with a predetermined distance according to X-axis coordinate values and Y-axis coordinate values of the measuring start point and the measuring end point to obtain scanned measuring points;

(c) obtaining a vertical distance between each of the scanned measuring points and the laser; and (d) computing measuring results, namely computing a Z-axis coordinate value of each of the scanned measuring points according to the corresponding vertical distance.

6. The method as described in claim 5, further comprising:

configuring measuring items before step (b), wherein the measuring items comprise: a maximum Z-axis coordinate value, a minimum Z-axis coordinate value, an average Z-axis coordinate value for all scanned measuring points, and smoothness for the Z-axis coordinate values of the scanned measuring points;

obtaining the maximum Z-axis coordinate value, the minimum Z-axis coordinate value, and computing the average Z-axis coordinate value of the scanned measuring points in step (d); and smoothing the Z-axis coordinate values of the scanned measuring points.

7. The method as described in claim 6, wherein smoothing the Z-axis coordinate values is performed by a mean value method or an intermediate value method.

8. The method as described in claim 5, further comprising:

outputting the measuring results in the form of text or picture.

* * * * *